United States Patent [19]
Mughannam

[11] 4,085,668
[45] Apr. 25, 1978

[54] HEAT EXCHANGE APPARATUS FOR PRODUCTS IN CONTAINERS

[75] Inventor: Adil A. Mughannam, San Jose, Calif.
[73] Assignee: FMC Corporation, San Jose, Calif.
[21] Appl. No.: 762,537
[22] Filed: Jan. 26, 1977
[51] Int. Cl.² .............................................. A23C 3/02
[52] U.S. Cl. ........................................ 99/483; 99/359
[58] Field of Search ............... 99/483, 467, 370, 359; 206/503, 509; 211/126

[56] References Cited
U.S. PATENT DOCUMENTS

| | | | |
|---|---|---|---|
| 3,511,169 | 5/1970 | Fritzberg | 99/370 |
| 3,590,727 | 6/1971 | Shevlin | 99/359 |
| 4,003,302 | 1/1977 | Mencacci | 99/359 |

*Primary Examiner*—Edward J. McCarthy
*Attorney, Agent, or Firm*—John F. Verhoeven

[57] ABSTRACT

A sterilizer for food products in containers receives carts having two tiers of channel-like trays, with water being circulated along the trays in direct contact with the containers. The underside of the bottom wall of each tray is welded to a pair of longitudinal channels, the inner sidewalls of which confine the lids of containers in the tray below and the outer sidewalls serve as tray locating flanges. The upper side of each tray bottom wall is welded to a pair of longitudinal angles having upstanding flanges for supporting the bottoms of the containers above the imperforate bottom wall of the tray. This construction facilitates direct contact of heat exchange liquid flowing along the trays with the surfaces of containers in the trays.

18 Claims, 6 Drawing Figures

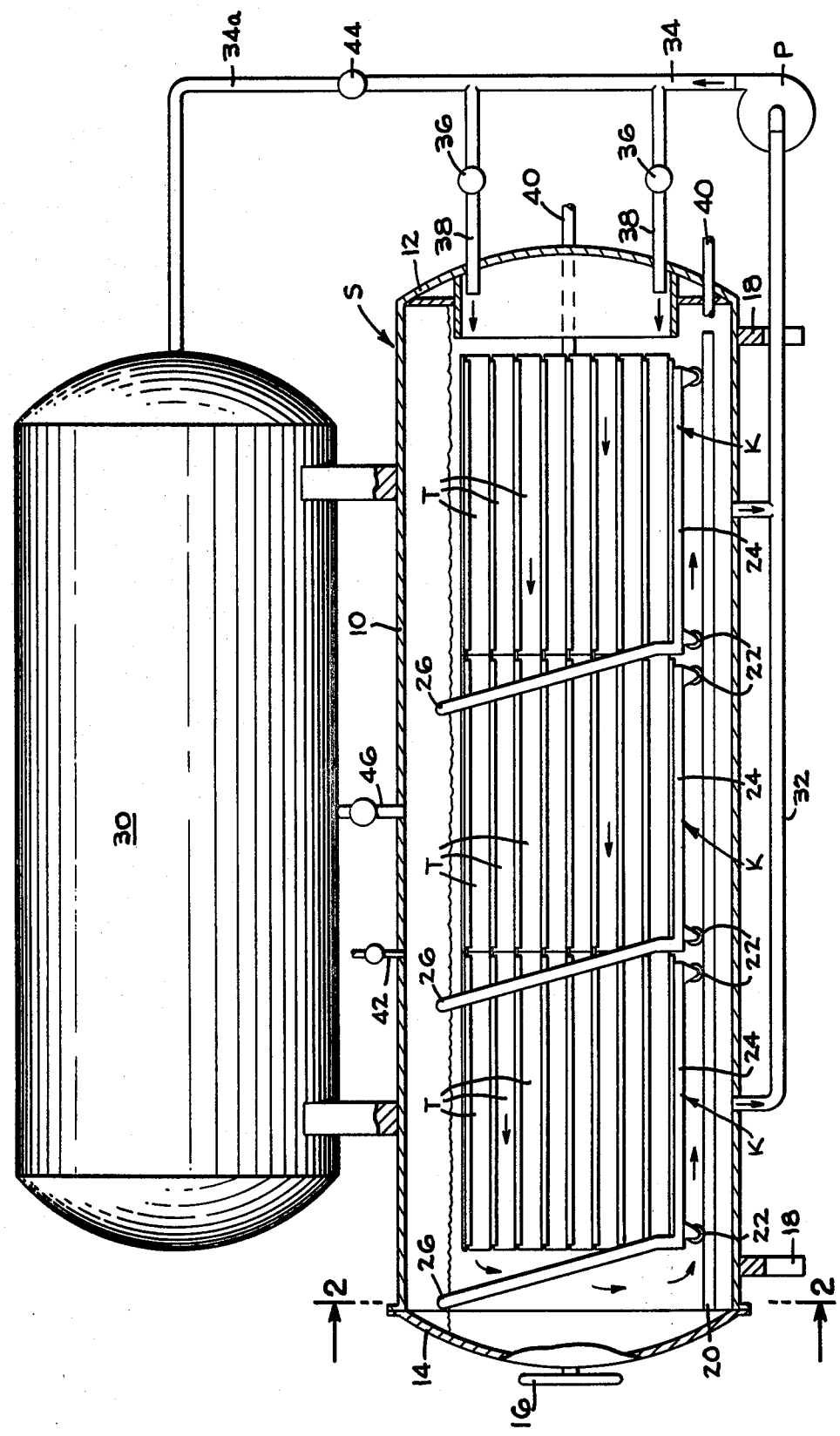
FIG_1

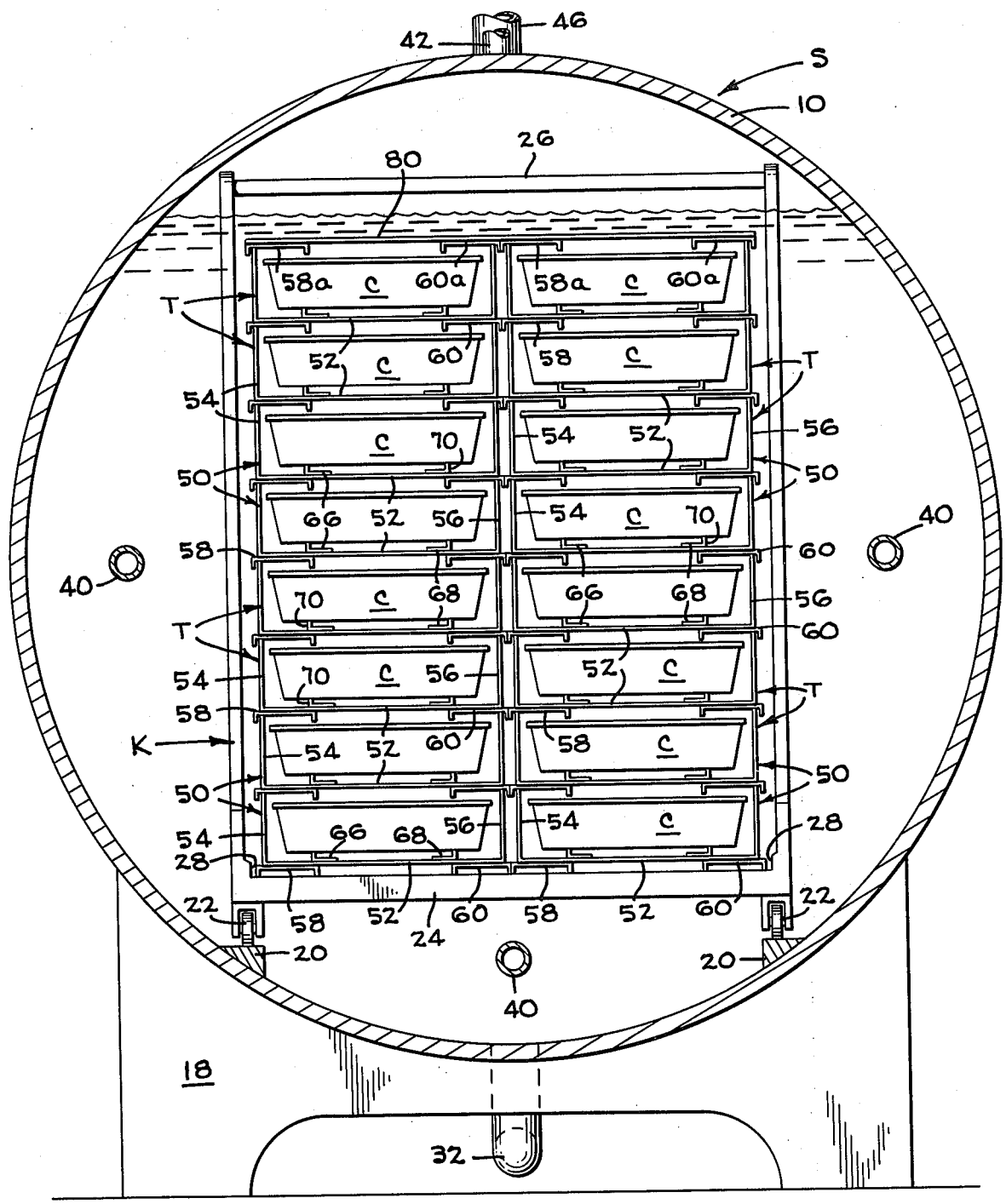

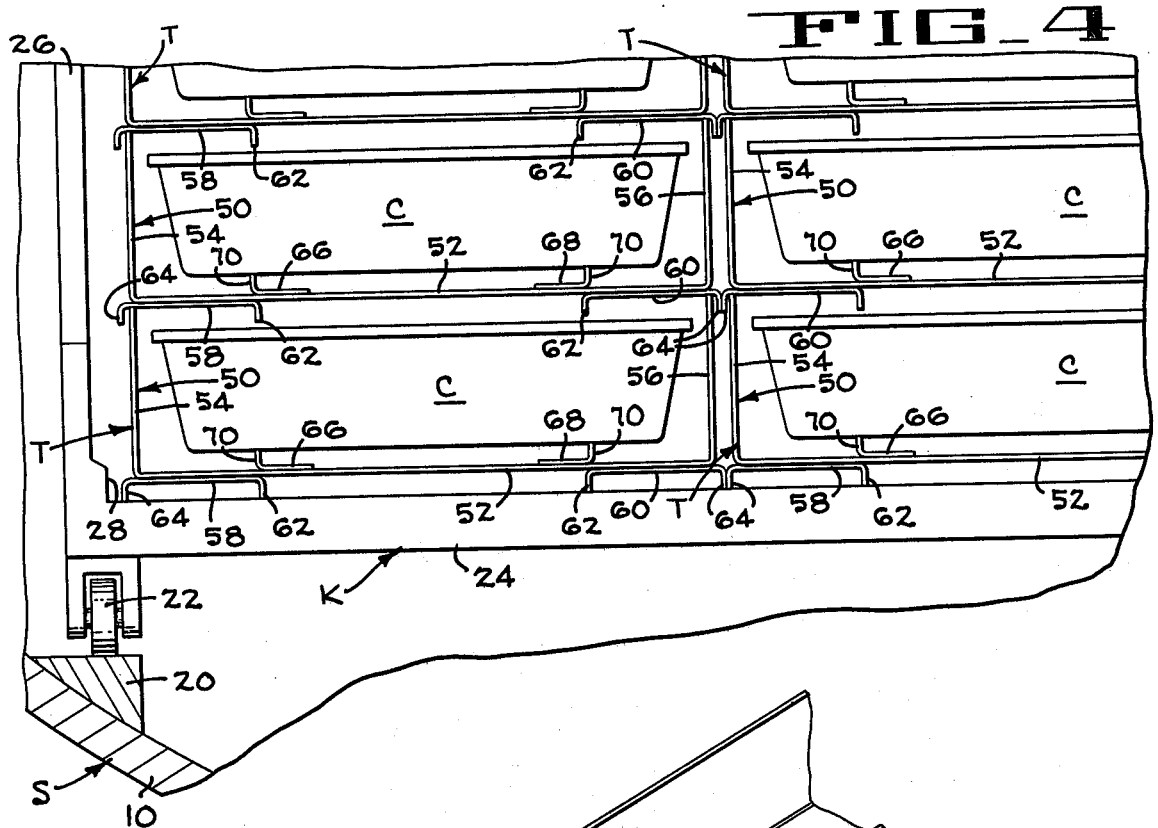
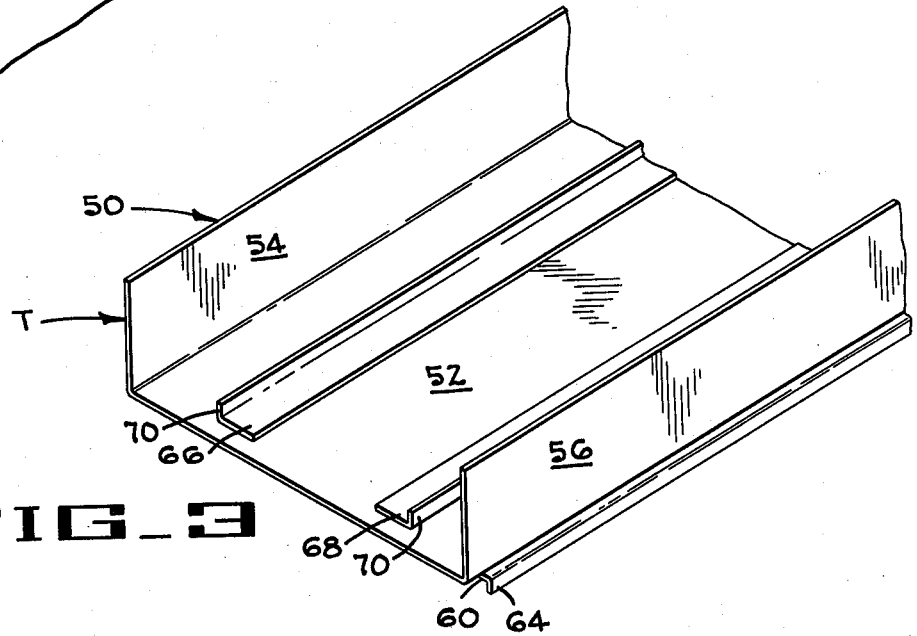
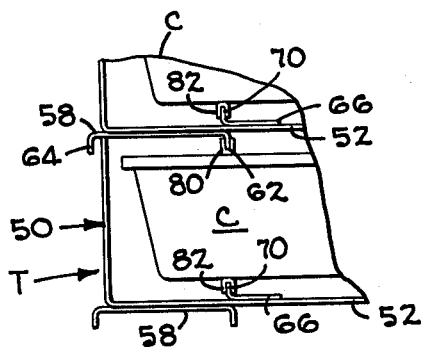
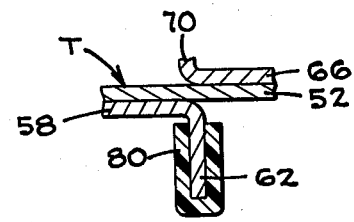

HEAT EXCHANGE APPARATUS FOR PRODUCTS IN CONTAINERS

FIELD OF THE INVENTION

This invention relates to fluid treatment apparatus such as sterilizers for food products or the like in containers wherein a fluid water is circulated in the sterilizer for heat exchange with the containers and the product therein.

DESCRIPTION OF PRIOR ART

This invention is an improvement in the heat exchange tray assembly and in the tray disclosed in the Mencacci et al U.S. Pat. No. 4,003,302, issued Jan. 18, 1977 and assigned to the FMC Corporation.

The Mencacci et al patent discloses a cylindrical chamber or retort which receives a plurality of carts. Each cart supports a single tier of longitudinally disposed, channel-like container supporting trays, each tray having a perforated bottom wall and two side walls. Each tray is provided with a perforated hold-down plate which rests on the upper surfaces of the containers and the side walls of each tray are provided with flanged supports for supporting the longitudinal edges of the tray above it. The tier of nested trays provide longitudinal channels or tunnels through which heating and cooling water may be circulated in the retort.

The patent to Fritzberg et al U.S. Pat. No. 3,511,169, May 12, 1970, shows a pressure cooking apparatus which receives a tier of rectangular trays, each tray having a perforated bottom wall 37b and four side walls. Each tray also has a perforated false bottom 37a so that the pouches or containers within the tray will be spaced from the bottom wall 37b. Two side walls are provided with openings 37c for admission of water between the two bottom walls. Each tray has welded thereto a plurality of tabs that support and align the tray above it.

SUMMARY OF THE INVENTION

The present invention is a fluid heat exchange device which is an improvement over that of the aforesaid Mencacci and Fritzberg et al patents. In the retorts of both of these patents, the product containers are supported directly on perforated plates and if the containers bulge during the heating or sterilizing operation, they encounter perforated plates above the containers.

In accordance with the present invention, channel-like trays are provided as in the aforesaid Mencacci patent but the containers are not supported directly on the bottoms of the trays so that the maximum area of the bottom of the containers can be subjected to direct heat transfer between the heating liquid and the container. This advantage is provided by the improvement wherein the upper sides of the bottom wall of the trays are provided with laterally spaced, longitudinally disposed upwardly projecting flange-like members for supporting the bottom of containers above the bottom wall of their trays. This construction maximizes the direct heat exchange between the liquid in the retort and the bottom of the container. Furthermore, the bottom walls of the trays need not be perforated rendering them economical to construct and reducing turbulent impedance to the longitudinal flow of liquid along the trays and past the containers therein.

The undersides of the bottom walls of the trays are provided with laterally spaced, longitudinally disposed, downwardly projecting flange-like members which hold the tops of containers in the trays away from the bottoms of the trays above, in case the containers float or otherwise tend to move upwardly. This construction also limits bulging of the tops of the containers while providing a maximum area for direct heat transfer between the liquid flowing along the trays and the top walls of the containers.

In the preferred embodiment, the underside of the bottom walls of the trays are also provided with longitudinally disposed downwardly projecting members adjacent their side walls for cooperating with the side walls of an underlying tray to limit relative lateral displacement of superposed trays.

Also, in the preferred embodiment, the downwardly projecting members are formed by the side walls of a pair of channels running along each side of the bottom of each tray and the lower edges of the downwardly projecting side walls of the channels are co-planar so that they may also serve as support feet for the lowermost tray in a tier of trays.

BRIEF DESCRIPTION OF THE DRAWINGS

FIG. 1 is a schematic diagram of a sterilizer or retort system embodying the tray assembly of the present invention.

FIG. 2 is a section taken on line 2 — 2 of FIG. 1.

FIG. 3 is a diagrammatic perspective of one of the trays of the present invention.

FIG. 4 is a fragmentary enlarged view of a portion of FIG. 2 to more clearly illustrate the construction of the trays.

FIGS. 5 and 6 are fragmentary views showing a modified form of the invention.

DETAILED DESCRIPTION

A sterilizer or retort system suitable for receiving an assembly of trays for the present invention is shown schematically in FIG. 1 and in the section of FIG. 2. The system illustrated in FIG. 1 is like that of the aforesaid Mencacci et al patent in that it provides longitudinal channels or tunnels for the circulation of heating or cooling water through sterilizing chamber or retort during the heating and cooling process. The complete fluid circulation and control system is described in detail in the aforesaid Mencacci application and the details of that portion of the system are not critical to the present invention. Thus, only the basic elements of the system shown in FIGS. 1 and 2 will be mentioned. The sterilizer retort S is a vessel having a cylindrical wall 10, a fixed end wall 12 and an opposite end wall formed as a hinged door 14. The door 14 is clamped closed by a clamp assembly indicated generally at 16, this construction being well known in the art.

In the system, the product supporting trays T are mounted as side-by-side tiers of trays in carts K. The sterilizer S is supported by longitudinally spaced leg plates 18.

The sterilizer assembly shown in FIG. 1 is loaded with three carts K, the construction of which is not critical to the present invention. In the embodiment shown, and as in the aforesaid Mencacci et al application, the wall 10 has tracks 20 (FIGS. 2 and 4) and each cart K is supported by wheel assemblies 22 riding on the tracks. Each cart has a floor 24 for supporting a tier of trays T and is manipulated by a U-shaped handle assembly 26. As seen in FIGS. 2 and 4, the lower ends of the handle assembly 26 are provided with abutments 28 to assist in laterally locating the lowermost trays T of the two tiers of trays mounted on the cart.

The details of the water heating and circulating system employed for the retort are not critical to the present invention and the system described in the aforesaid Mencacci et al application is illustrated and will be mentioned briefly. The principal function of the system is that of providing horizontal flow of heat exchange liquid, such as water, along the channeled trays for providing optimum heat exchange directly between the liquid and the containers C supported in the trays. The system includes a water circulating pump P and a storage tank 30 which is most conveniently mounted above the sterilizer or retort S. In normal operation, the pump P withdraws liquid from the bottom of the sterilizer S through a branched header line 32 and directs that liquid by means of a line 34 through open valves 36. These valves force the water through delivery pipes 38 within the sterilizer S and the pipes 38 are disposed so as to cause a horizontal flow of heat exchange liquid within the sterilizer, as illustrated by the arrows in FIG. 1. For sterilizing or cooking the products within the container C, steam is introduced into the liquid within the sterilizer by steam pipes 40. These pipes extend substantially the full length of the sterilizer and are apertured so that steam can flow out of the pipes and heat the surrounding liquid. Air under pressure can be introduced to the sterilizer through a valved inlet 42 so that heating can take place at superatmospheric pressure.

After completion of the process and before opening the door 14, the liquid is withdrawn from the sterilizer and pumped into the storage tank 30. This is accomplished by closing the valves 36, previously referred to, and by opening a valve 44 in a branch line 34a of the pump delivery line. The pump will now withdraw liquid from the sterilizer and deliver it to the storage tank 30. The tank 30 has a valved outlet line 46 which is now closed, but which is opened in order to drain the stored liquid back into the sterilizer for a new cycle.

Tray Construction

The manner in which two tiers of trays may be loaded into a cart K is best seen in FIG. 2. FIG. 4 is an enlarged fragmentary section like FIG. 2 which more clearly illustrates the tray construction and FIG. 3 is a diagrammatic perspective of a tray. All of the trays T are alike and each is formed of an elongated channel member 50 bent up from stainless steel sheet metal. Each tray has an imperforate bottom wall 52, and upstanding sidewalls 54,56. Elongated channel members 58,60 are spot welded to the underside of each bottom wall 52. These channel members are preferably identical and each is formed with an inner flange member 62 and an outer depending flange member 64.

As seen in FIG. 4, the lowermost tray of a tier is supported by the floor 24 of the cart and since the lower edges of the depending flange members 62,64 are coplanar, they form supporting feet for the tray while accommodating the flow of liquid longitudinally through the sterilizer.

Spot welded to the upper side of the bottom wall 52 of each container are angles 66,68. These are provided with upwardly projecting flange-like members 70 which support the bottoms of the containers C in spaced relation to the imperforate bottom wall 52 of their associated tray. This construction also accommodates the longitudinal flow of liquid along each tray with liquid being in direct contact with the bottoms of the containers they support. This construction eliminates the cost of perforating the bottoms 52 of the trays and reduces turbulence in the linear flow of the heat exchange liquid which might result from the presence of such perforations.

In order to hold the tops of the containers away from the bottoms of the trays above and to limit bulging of the containers during a cooking or sterilizing process, the channel members 58,60 are formed so that their depending flange members 62 terminate substantially at the cover portion of the associated containers C. These flanges, in cooperation with the lower upwardly projecting flanges 70, confine the containers C against excessive bulging without interfering with the longitudinal flow of heat exchange liquid along each tray for direct contact with both the tops and the lids of the containers. Also, this construction eliminates the need for hold-down plates, such as those shown in the aforesaid Mencacci et al patent, and eliminates the need for false bottoms for the trays as in the Fritzberg patent. Thus, as in the case of the bottom walls of each container C, provision is made for a direct contact, smooth, non-turbulent flow of heat exchange liquid along each tray in direct contact with the lids of the containers.

In order to laterally locate a given tray against excessive displacement relative to the tray below it, the outer flanges 64 of the channel 58,60 depend adjacent to the side walls 54,56 of the tray below it.

It will be noted that the construction of each tray T facilitates formation of the tray and its cooperation with other trays by the simple process of bending up unperforated strips of sheet metal in simple, channel or angle form and spot welding them together. As seen in FIGS. 2 and 4, where two tiers of trays are mounted in each cart, the tiers are located relative to one another by the adjacent depending flanges 64,62 of the associated channels 60,58.

Thus, it can be seen that the tray construction of the present invention can be economically produced from unperforated sheet metal such as stainless steel, provides smooth heat exchange flow between the liquid in the sterilizer and substantially the entire surface of each container C, does not require hold-down plates and does not require that the channels 50, forming the body of each tray, be perforated.

As seen in FIG. 2, the containers C in the uppermost trays of the tiers are prevented from bulging by a hold down plate 80. This plate is provided with channels 58a, 60a corresponding to the channels 58,60. The depending flanges on the channels 58a, 60a provide the same bulge resisting and location functions as are provided by the corresponding flanges 62,64 of the tray channels.

Modified Form

FIGS. 5 and 6 are fragmentary views showing a modified form of the invention. In this form, the construction of each tray T is like that previously described. However, the containers C are more closely confined between the upwardly projecting flanges 70 and the downwardly projecting flanges 62 without danger of breakage, rupture or excessive deformation of the thin sheet material of the containers in case they bulge during heat treatment. This closer confinement of the containers without damage is provided by adding relatively resilient heat resistant clips 80,82 to the depending flanges 62 and to the upstanding flanges 70. These clips are formed of an elastomeric material, such as Teflon or the like, and are dimensioned so that they firmly grip their associated flanges. Preferably, each clip 80,82 extends the full length of its associated flange.

To give a typical, but non-limiting example, the tray body channels 50 are about 10 inches wide, 37 inches long with side walls 50,56 about 3 inches high. The channels 58,60 are about 2½ inches wide and their flanges 62,64 are about ⅜ inch deep, as are the upstanding flanges 70. All elements are formed from 18 gauge stainless steel.

Although the best mode contemplated for carrying out the present invention has been herein shown and described, it will be apparent that modification and variation may be made without departing from what is regarded to be the subject matter of the invention as defined in the appended claims.

I claim:

1. In a fluid treatment apparatus for food products or the like in containers, said apparatus being of the type comprising a processing chamber, means for mounting open ended channel-like container supporting trays having a bottom wall and side walls in said chamber, the side walls of a lower tray supporting a tray above it and means for circulating hot water along said trays for heat exchange with the products; the improvement wherein the upper sides of the bottom walls of said trays are provided with laterally spaced, longitudinally disposed upwardly projecting members for supporting the bottoms of containers above the bottom wall of their trays and the under sides of the bottom walls of the trays are provided with laterally spaced, longitudinally disposed, downwardly projecting members for confining the tops of containers in the trays below, during treatment.

2. The apparatus of claim 1, wherein the upwardly and downwardly projecting members are flange-like members.

3. The apparatus of claim 1, wherein the undersides of the bottom walls of the trays are also provided with longitudinally disposed, downwardly projecting members adjacent the tray side walls for cooperating with the side walls of an underlying tray, to limit relative lateral displacement of superposed trays.

4. The apparatus of claim 3, wherein said downwardly projecting members of a tray extend along the outside of the side walls of the underlying tray.

5. The apparatus of claim 3, wherein said downwardly projecting members for a tray are formed as the side members of channels disposed at each side of the tray.

6. The apparatus of claim 3, wherein the lower edges of said downwardly projecting members are co-planar so that the members may also serve as supports for a lowermost tray in a tier.

7. The apparatus of claim 1, wherein said upwardly projecting members and said downwardly projecting members are formed as substantially continuous longitudinal flanges.

8. The apparatus of claim 1, wherein the bottom walls of said trays are substantially imperforate.

9. A tray for supporting containers of food products or the like in a fluid treatment device, said tray being of the type comprising an open ended channel-like container support having a bottom wall and side walls for supporting a tray above it; the improvement in said tray wherein the upper side of the bottom wall of the tray is provided with laterally spaced, longitudinally disposed upwardly projecting members for supporting the bottoms of containers above the bottom wall of the tray and the under side of the bottom wall of the tray is provided with laterally spaced, longitudinally disposed, downwardly projecting members for confining the tops of containers in a tray below, during treatment.

10. The tray of claim 9, wherein said upwardly and downwardly projecting members are flange-like members.

11. The tray of claim 9, wherein the underside of the bottom wall of the tray is also provided with longitudinally disposed, downwardly projecting members adjacent the tray side walls for cooperating with the side walls of an underlying tray, to limit relative lateral displacement of superposed trays.

12. The tray of claim 10, wherein said downwardly projecting members are laterally spaced by a distance greater than the spacing between the side walls of the tray.

13. The tray of claim 10, wherein said downwardly projecting members are formed as the side members of channels disposed at each side of the tray.

14. The tray of claim 11, wherein the lower edges of said downwardly projecting members are co-planar so that the members may also serve as supports for the tray.

15. The tray of claim 9, wherein said upwardly projecting members and said downwardly projecting members are formed as substantially continuous flanges.

16. The tray of claim 9, wherein the bottom wall of of said tray is substantially imperforate.

17. The tray of claim 15, wherein the edges of said flanges are covered with elastomeric material.

18. A structure for supporting a container in heat exchange relationship with a fluid comprising a bottom plate with upwardly projecting members to support the bottom of the container, a top plate with downwardly projecting members to hold the top of the container away from the top plate, side plates cooperating with said bottom and top plates to provide channels above and below the container for the passage of heat exchange fluid.

* * * * *